Jan. 2, 1940.  R. ORTHUBER ET AL  2,185,606
FREQUENCY STABILIZER
Filed Feb. 26, 1937
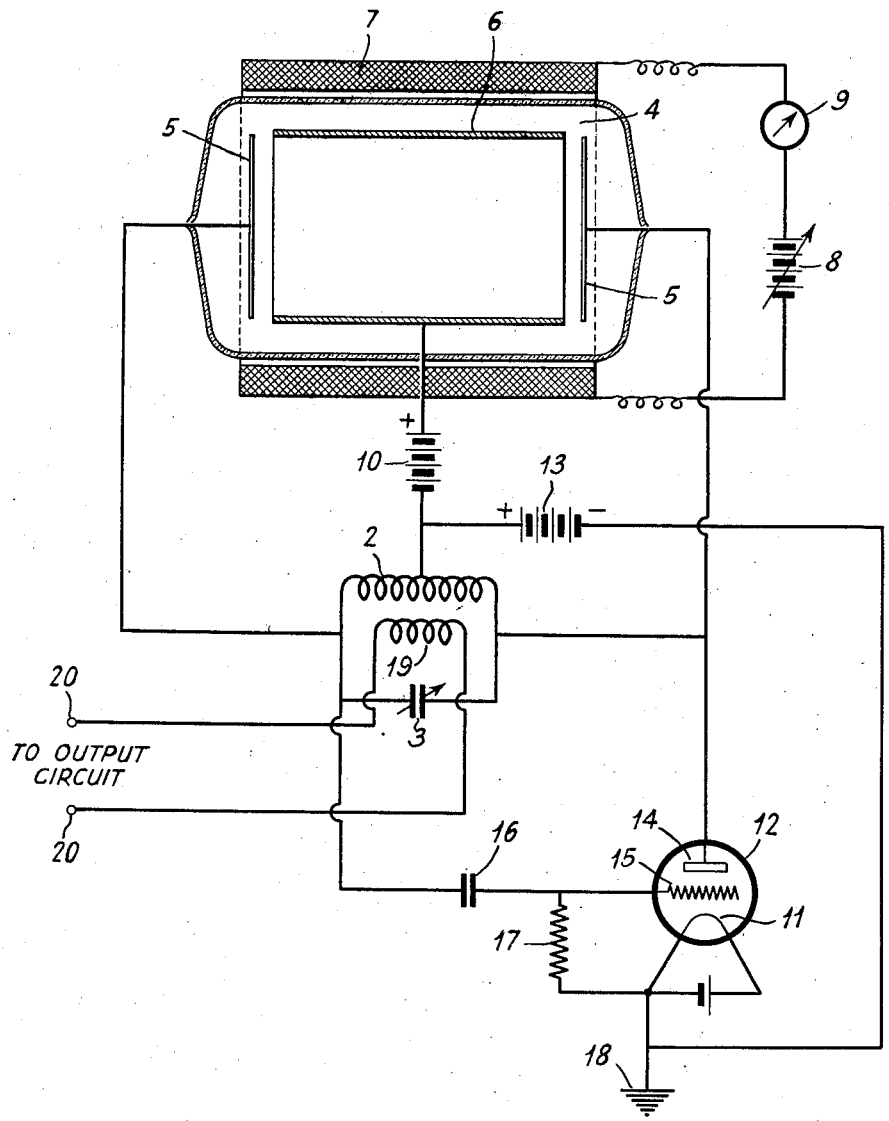
INVENTORS
RICHARD ORTHUBER
EBERHARD STEUDEL
BY
ATTORNEY Patented Jan. 2, 1940

2,185,606

UNITED STATES PATENT OFFICE 2,185,606

FREQUENCY STABILIZER

Richard Orthuber and Eberhard Steudel, Berlin, Germany, assignors to Allgemeine Elektricitats Gesellschaft, Berlin, Germany, a corporation of Germany Application February 26, 1937, Serial No. 127,840
In Germany February 26, 1936

6 Claims. (Cl. 250—36)

It is known that the frequency of an oscillatory circuit can be stabilized through the insertion of a piezo-quartz in the oscillatory circuit.

Furthermore, an electronic multiplier has been disclosed, for example, by "Radio Engineering" for November 1934, pages 18 and 19. This publication discloses an arrangement which serves for amplifying an electron current. This arrangement consists of two electrodes arranged in a vacuum vessel, and which have an alternating potential impressed thereon such that electrons emanating from the one electrode, are accelerated towards the other electrode in the one phase of the alternating potential, and release thereat secondary electrons which in turn are again accelerated back to the first electrode in the second phase. In this way there takes place a multiplication of the original electron current by secondary electrons. This secondary electron multiplier just as the piezo-electric quartz, has a certain natural frequency, at which its inner resistance is a purely ohmic resistance. In the general case the impedance of the multiplier depends on the frequency of the exciting potential, and is a purely capacitive reactance especially at low frequencies.

In accordance with the invention for stabilizing the frequency of an oscillatory circuit a so-called dynamic type multiplier device of the character above suggested is utilized in place of a piezo-crystal. The dynamic type electron multiplier tube and circuit combination is suited for the frequency stabilization is due to the fact that owing to its small damping it was found that it has a sharp resonance curve similar to that of the piezo-quartz.

An embodiment of the arrangement according to the invention is shown in the drawing by way of example. The idea of the invention will now be elucidated by reference to this drawing. In the known oscillatory circuit, comprising inductance 2 and capacity 3, an electronic dynamic type multiplier 4 is inserted. The multiplier tube has two electrodes (cathodes) 5 which carry the alternating potential to be maintained constant. The resonance frequency of the multiplier can be set at will by means of the direct potential applied to a cylinder (the anode) 6 and the resonance resistance of the multiplier can be varied by means of a magnetic field produced by a coil 7 arranged to surround the tube 4 for substantially its length. The coil 7 is energized from a potential source 8 arranged in series with a current meter 9 to indicate the current flowing. The anode 6 is supplied with voltage from the source 10 which has one terminal connected to the central point of the inductance 2 of the oscillatory circuit. The ends of the oscillatory circuit are connected to the electrodes or cathodes 5 of the multiplier tube 4.

In the arrangement by which the invention has been illustrated for convenience the system has been shown in the form of a Hartley oscillatory circuit where the inductive element has been center-tapped and connected to the cathode 11 of the oscillator tube 12 through the battery 13 which is so poled that it supplies positive voltage to the anode 14 of this oscillator tube. In the connection shown the anode 14 of the oscillator tube 12 connects to one end of the oscillatory or tank circuit and the grid electrode 15 connects to the opposite end of the oscillatory or tank circuit through the condenser 16. A grid leak 17 connects between the grid 15 and the cathode 11 which latter element is grounded at 18. Output energy from the oscillator may be derived by coupling the coil 19 to the inductive element 2 of the oscillatory or tank circuit so that output energy may be taken from the terminal points 20.

In this arrangement it will be seen that the multiplier tube combination replaces the piezo-electric crystal which for a Hartley type oscillator is connected in one form across the oscillatory circuit. Of course, it will be apparent that the multiplier tube may also be connected in any other manner than that shown, as is well known, for establishing connections of the piezo-electric crystals in order to stabilize any type of oscillator. Furthermore, it will be apparent that while the invention has been illustrated in connection with the form of Hartley type oscillator, it will be appreciated that other types of oscillators may be used equally as well and while the so-called shunt feed type of Hartley circuit is illustrated, it is, of course, obvious that the invention applies equally well to the so-called series feed type device.

Also it is apparent that the arrangement is equally adapted to use with the so-called Colpitts type oscillator or with the tune-plate-tune-grid type, the so-called "TNT" type, the dynatron type, the tuning fork type, the Barkhausen-Kurz type, or the magnetron type device. While the specific illustration of the dynamic type electron multiplier device, with all of the foregoing types of oscillators, has not been specifically illustrated, it is of course, apparent that this dynamic type multiplier device when used with circuits of the foregoing types, would be connected in accordance with the manner shown in the present invention and substituted for the crystal customarily used for stabilizing the oscillator.

It will be appreciated that this form of oscillatory control offers a material advantage in many instances over the piezo-electric crystal type because of the fact that it is possible to derive high power at once, whereas in the piezo-electric type of control, heating of the crystal occurs upon a material increase in power with the result that a drift in the oscillatory frequency may take place. However, with this type of control substantially no drift at all results and therefore high power tubes may be used directly without amplification of the developed oscillatory energy.

The arrangement according to the invention offers other various advantages over the known frequency stabilizers. On the one hand it is possible to vary in a very simple manner the natural frequency and the inner resistance of the multiplier tube and, furthermore, the arrangement is especially suited for stabilizing short waves, which can only be accomplished with difficulty when using a quartz crystal or other piezo-electric substances in view of the fact that it is technically difficult to obtain these substances with the small dimensions necessary for this purpose.

Eventually it will be necessary that by the use of electron optical reproduction elements the electrons are prevented from impinging on the plate cylinder 6, in order that the damping be as low as possible, and on the other hand, it will be suitable to take care that the electrons will only be multiplied to a minor degree so that a delivery of electrons to the plate cylinders will not be necessary.

We claim:

1. In combination, a thermionic oscillator including an oscillatory tank circuit, secondary emission means having a predetermined resonant operating frequency, and means for connecting said means in parallel with the oscillatory tank circuit for stabilizing the oscillator.

2. A thermionic oscillator comprising an oscillatory tank circuit having a relatively broad operating range, means connected effectively in parallel with the tank circuit having a narrow resonant operating range comprising a pair of opposed cathodes and means for maintaining electron traversal and retraversal in the space between the cathodes at resonant frequency for stabilizing the oscillator.

3. A thermionic oscillator including an oscillatory tank circuit, means connected effectively in parallel with the tank circuit comprising a pair of opposed cathodes and means for maintaining resonant electronic oscillations between the cathodes for stabilizing the rate of operation of the oscillator at resonant frequency by electronic oscillations between said cathodes.

4. An oscillator comprising a thermionic tube having a plurality of electrodes and an oscillatory circuit, means for connecting certain of the electrodes to the oscillatory circuit, means to stabilize the rate of operation of the oscillator comprising a pair of opposed plates connected effectively in parallel with the oscillatory circuit, and means, including said plates, for producing and oscillating secondary electrons therebetween whereby the rate of operation of the oscillator is determined by the resonant frequency of the secondary electron oscillator.

5. An oscillator comprising a thermionic tube having a plurality of electrodes and an oscillatory circuit, means for connecting the electrodes to the oscillatory circuit, means to stabilize the oscillator comprising a pair of opposed cathodes connected effectively in parallel with the oscillatory circuit, each having surfaces adapted to emit electrons by impact, and means to maintain electron oscillation between the cathodes at resonant frequency whereby the oscillating frequency of the oscillator is determined thereby.

6. In combination, a thermionic oscillator comprising an oscillatory tank circuit and means to stabilize the oscillator comprising a pair of opposed cathodes connected to the ends of the tank circuit, said cathodes being adapted to emit secondary electrons by impact, an anode positioned between said cathodes, means for connecting said anode to the midpoint of the tank circuit, and means, including said cathodes, for maintaining resonant electron oscillation between the cathodes.

EBERHARD STEUDEL.
RICHARD ORTHUBER.